(12) United States Patent
Zhao et al.

(10) Patent No.: US 9,570,043 B2
(45) Date of Patent: Feb. 14, 2017

(54) METHOD FOR PROCESSING RGB DATA AND SYSTEM FOR THE SAME

(71) Applicant: BOE TECHNOLOGY GROUP CO., LTD., Beijing (CN)

(72) Inventors: Xingxing Zhao, Beijing (CN); Wenjie Jiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 14/128,671

(22) PCT Filed: Nov. 28, 2012

(86) PCT No.: PCT/CN2012/085466
§ 371 (c)(1),
(2) Date: Dec. 23, 2013

(87) PCT Pub. No.: WO2014/012316
PCT Pub. Date: Jan. 23, 2014

(65) Prior Publication Data
US 2015/0138227 A1    May 21, 2015

(30) Foreign Application Priority Data

Jul. 18, 2012   (CN) .......................... 2012 1 0250156

(51) Int. Cl.
*G09G 5/02* (2006.01)
*G09G 5/06* (2006.01)
(Continued)

(52) U.S. Cl.
CPC .............. *G09G 5/06* (2013.01); *G09G 3/2003* (2013.01); *H04N 5/57* (2013.01); *H04N 9/67* (2013.01);
(Continued)

(58) Field of Classification Search
CPC ............ G09G 5/06; G09G 5/02; G09G 5/395; G09G 5/14; G06T 11/001
(Continued)

(56) References Cited

U.S. PATENT DOCUMENTS

| 5,943,058 A * | 8/1999 | Nagy ...................... G06T 15/04 345/582 |
| 7,110,046 B2 * | 9/2006 | Lin .......................... H04N 5/20 345/589 |

(Continued)

FOREIGN PATENT DOCUMENTS

| CN | 101329859 A | 12/2008 |
| CN | 101370148 A | 2/2009 |

(Continued)

OTHER PUBLICATIONS

"Brightness Adjustment for HDR and Tone Mapped Images" (by Grzegorz Krawczyk, Rafal Mantiuk, Dorota Zdrojewska, and Hans-Peter Seidel, in 15th Pacific Conference on Computer Graphics and Applications, DOI: 10.1109/PG.2007.38, Publication Year: 2007, pp. 373-381).*

(Continued)

*Primary Examiner* — Ke Xiao
*Assistant Examiner* — Gordon Liu
(74) *Attorney, Agent, or Firm* — Ladas & Parry LLP (57) ABSTRACT

The present invention relates to the art of color space conversion technique, and discloses a method for processing RGB data and a system for the same. The method comprises: S1: converting input values of three colors RGB into a HSV color space; S2: adjusting a brightness value V while keeping a hue value H and a saturation value S unchanged in the HSV color space; S3: converting the H, S, V values processed by step S2 from the HSV color space to the R, G, B, W color space to display. By converting the RGB color (Continued)

space to the HSV color space firstly, then enhancing the brightness V while keeping H, S unchanged in the HSV color space, and finally converting the HSV color space to the RGBW color space, it can be achieved that the brightness for display is enhanced while better hue, color saturation and natural color transition are maintained at the same time.

6 Claims, 4 Drawing Sheets

(51) Int. Cl.
  *H04N 5/57*  (2006.01)
  *H04N 9/67*  (2006.01)
  *G09G 3/20*  (2006.01)
(52) U.S. Cl.
  CPC ............... *G09G 2320/0233* (2013.01); *G09G 2320/0242* (2013.01); *G09G 2320/0666* (2013.01); *G09G 2340/06* (2013.01)
(58) Field of Classification Search
  USPC ....................................................... 345/601
  See application file for complete search history.

(56) References Cited

U.S. PATENT DOCUMENTS 8,049,763 B2 * 11/2011 Kwak et al. ................... 345/589
2005/0185836 A1 * 8/2005 Huang .......................... 382/162

FOREIGN PATENT DOCUMENTS

| CN | 101866642 A | 10/2010 |
| CN | 102576523 A | 7/2012 |
| CN | 102769758 A | 11/2012 |

OTHER PUBLICATIONS

International Preliminary Report on Patentability for International Application No. PCT/CN2012/085466, eight (8) pages.
English abstract for CN101866642, two (2) pages.
English abstract for CN102576523, two (2) pages.
International Search Report for International Application No. PCT/CN2012/085466, 12pgs.
International Preliminary Report on Patentability Appln. No. PCT/CN2012/085466; Dated Jan. 20, 2015.

* cited by examiner

METHOD FOR PROCESSING RGB DATA AND SYSTEM FOR THE SAME

CROSS REFERENCE TO RELATED APPLICATIONS

This application is based on International Application No. PCT/CN2012/085466 filed on Nov. 28, 2012, which claims priority to Chinese National Application No. 201210250156.6 filed on Jul. 18, 2012, the contents of which are incorporated herein by reference.

TECHNICAL FIELD

The present disclosure relates to the art of color space conversion technique, particularly to a method for processing RGB data and a system for the same.

BACKGROUND

In a display apparatus such as a Liquid Crystal Display, an Organic Light-Emitting Diode display, in general, a Red-Green-Blue (RGB) display technique is utilized to display; such technique has a disadvantage that the brightness for display is relatively low so that the power consumption of the display apparatus increases. If the RGB color space is converted to Red-Green-Blue-White (RGBW) color space to display, the brightness for display can be enhanced and thus the power consumption is saved; however, the RGBW display technique often brings about the issue of decreased color saturation and unnatural color transition and the like, and whether a display apparatus to which the RGBW technique applied can be manufactured massively depends on the display effect the RGBW technique brings about.

Therefore, how to enhance the brightness for display while maintaining better hue, color saturation and natural color transition at the same time is a technical problem to be solved urgently.

SUMMARY

I. The Problem to be Solved

The embodiments of the present invention are intended to solve the problem that how to enhance the brightness for display while maintaining better hue, color saturation and natural color transition at the same time.

II. Technical Solutions

To solve the above problem, the embodiments of the present invention provide a method for processing RGB data, wherein the method comprises:

S1: converting input values of three colors RGB into a HSV color space;

S2: adjusting a brightness value V while keeping a hue value H and a saturation value S unchanged in the HSV color space;

S3: converting the H, S, V values processed by step S2 to R, G B, W values for display.

In the above method, in the step S2, the brightness value V is adjusted using a Gaussian function, $V(RGBW)=V(RGB)*y$; wherein $y=A*e^{-a*(s/4)^2}+B$ wherein, y represents an adjusting coefficient of brightness, A represents an amplitude of the Gaussian function, 'a' represents a parameter determining a Half-Width Height of the Gaussian function, s represents the saturation value, B represents the adjustment value when s=255.

In the above method, in the step S3, the R, G, B and W values to be interpolated corresponding to the H, S, and V values processed in the step S2 are looked up via a three-dimension look-up table, and the converted R, G, B, and W values are obtained by using the R, G B and W values to be interpolated as found out.

In the above method, the step S3 is specifically as follows: dividing a cube in the look-up table where an input point X is located into eight small cubes by three planes perpendicular to each other passing through the input point X in the directions of x, y, and z axes respectively, and the coordinates of the input point X correspond to the obtained H, S, V values after being processed in step S2; the corresponding R, G, B, W values to be interpolated are found out via the look-up table according to the H, S, and V values; the volumes of the small cubes where the respective vertexes of the cube pi are located are as follows:

$$V_0 = r_0 \cdot b_0 \cdot g_0$$

$$V_1 = r_0 \cdot b_0 \cdot (n-g_0)$$

$$V_2 = r_0 \cdot (m-b_0) \cdot g_0$$

$$V_3 = r_0 \cdot (m-b_0) \cdot (n-g_0)$$

$$V_4 = (l-r_0) \cdot b_0 \cdot g_0$$

$$V_5 = (l-r_0) \cdot b_0 \cdot (n-g_0)$$

$$V_6 = (l-r_0) \cdot (m-b_0) \cdot g_0$$

$$V_7 = (l-r_0) \cdot (m-b_0) \cdot (n-g_0)$$

wherein, $r_0$, $b_0$, $g_0$ represent the vertical distances from the input point X to the x, y and z axes respectively, m, n, l represent the length, width and height of the cube, then $$x' = \frac{1}{V} \sum_{i=0}^{7} q_i \cdot V_{7-i},$$

x' represents the obtained R, G, B, W values after conversion, $q_i$ represents the R, G, B, W values to be interpolated corresponding to the eight vertexes of the cube in the look-up table, the coordinates of the eight vertexes of the cube represent the H, S, V values, i=0, 1, ..., 7.

In the above method, the step S1 is specifically as follows: performing the conversion by means of the following equations:

$$h = \begin{cases} 0° & \text{if max = min} \\ 60° \times \frac{g-b}{\max - \min} + 0°, & \text{if max = r and } g \geq b \\ 60° \times \frac{g-b}{\max - \min} + 360°, & \text{if max = r and } g < b \\ 60° \times \frac{b-r}{\max - \min} + 120°, & \text{if max = g} \\ 60° \times \frac{r-g}{\max - \min} + 240°, & \text{if max = b} \end{cases}$$

$$s = \begin{cases} 0, & \text{if max = 0} \\ \frac{\max - \min}{\max} = 1 - \frac{\min}{\max}, & \text{otherwise} \end{cases}$$

$$v = \max$$

wherein, r represents the input value of color R, g represents the input value of color G, b represents the input value of color B, max represents the maximum in r, g and b, min represents the minimum in r, g, and b, h represents hue, s represents saturation, and v represents brightness.

The embodiments of the present invention further provide a system for processing RGB data, wherein the processing system comprises:

a first conversion module for converting the input values of three colors Red, Green and Blue (RGB) into a HSV color space;

a brightness adjusting module for adjusting the brightness value V while keeping the hue value H and the saturation value S unchanged in the HSV color space;

a second conversion module for converting the H, S, V values processed by the brightness adjusting module from the HSV color space into the RGBW color space.

In the above system, the brightness adjusting module is particularly used for adjusting the brightness value V using the Gaussian function, V(RGBW)=V(RGB)*y; wherein $$y = A * e^{-a*(s/4)^2} + B,$$

wherein, y represents an adjusting coefficient of brightness, A represents an amplitude of the Gaussian function, 'a' represents a parameter determining a Half-Width Height of the Gaussian function, s represents the saturation value, B represents the adjustment value when s=255.

In the above system, the second conversion module is specifically used for looking up the R, G, B and W values to be interpolated corresponding to the H, S, and V values processed by the brightness adjusting module, and for obtaining the converted R, B, and W values by using the R, G B and W values to be interpolated as found out.

In the above system, the second conversion module is specifically used for dividing a cube in the look-up table where an input point X is located into eight small cubes by three planes perpendicular to each other passing through the input point X in the directions of x, y, and z axes respectively, and the coordinates of the input point X correspond to the obtained H, S, V values after being processed in step S2; the corresponding R, G, B, W values to be interpolated are found out via the look-up table according to the H, S, and V values. The volumes of the small cubes where the respective vertexes of the cube pi are located are as follows:

$$V_0 = r_0 \cdot b_0 \cdot g_0$$

$$V_1 = r_0 \cdot b_0 \cdot (n - g_0)$$

$$V_2 = r_0 \cdot (m - b_0) \cdot g_0$$

$$V_3 = r_0 \cdot (m - b_0) \cdot (n - g_0)$$

$$V_4 = (l - r_0) \cdot b_0 \cdot g_0$$

$$V_5 = (l - r_0) \cdot b_0 \cdot (n - g_0)$$

$$V_6 = (l - r_0) \cdot (m - b_0) \cdot g_0$$

$$V_7 = (l - r_0) \cdot (m - b_0) \cdot (n - g_0)$$

wherein, $r_0$, $b_0$, $g_0$ represent the vertical distances from the input point X to the x, y and z axes respectively, m, n, l represent the length, width and height of the cube, then $$x' = \frac{1}{V} \sum_{i=0}^{7} q_i \cdot V_{7-i},$$

x' represents the obtained R, G B, W values after conversion, $q_i$ represents the R, G, B, W values to be interpolated corresponding to the eight vertexes of the cube in the look-up table, and the coordinates of the eight vertexes of the cube represent the corresponding H, S, V values in the look-up table, i=0, 1, . . . , 7.

In the above system, the first conversion module is specifically used for performing the conversion by means of the following equations:

$$h = \begin{cases} 0° & \text{if max} = \text{min} \\ 60° \times \frac{g-b}{\text{max}-\text{min}} + 0°, & \text{if max} = r \text{ and } g \geq b \\ 60° \times \frac{g-b}{\text{max}-\text{min}} + 360°, & \text{if max} = r \text{ and } g < b \\ 60° \times \frac{b-r}{\text{max}-\text{min}} + 120°, & \text{if max} = g \\ 60° \times \frac{r-g}{\text{max}-\text{min}} + 240°, & \text{if max} = b \end{cases}$$

$$s = \begin{cases} 0, & \text{if max} = 0 \\ \frac{\text{max}-\text{min}}{\text{max}} = 1 - \frac{\text{min}}{\text{max}}, & \text{otherwise} \end{cases}$$

$$v = \text{max}$$

wherein, r represents the input value of color R, g represents the input value of color G, b represents the input value of color B, max represents the maximum in r, g and b, min represents the minimum in r, g, and b, h represents hue, s represents saturation, and v represents brightness.

III. Beneficial Effect

The above technical solutions have the advantages in that the RGB color space is firstly converted to the HSV color space, then the brightness V is enhanced while keeping H, S unchanged in the HSV color space, and finally the HSV color space is converted to RGBW color space; thus enhancing the brightness for display while maintaining better hue, color saturation and natural color transition at the same time.

BRIEF DESCRIPTION OF THE DRAWINGS

FIG. 5c is a HSV color effect diagram corresponding to FIG. 5a;

FIG. 7a is a section diagram when S=0 corresponding to FIG. 6a.

DETAILED DESCRIPTION OF EMBODIMENTS

Implementations of the present invention are described in detail hereinafter in combination with the accompanying drawings and embodiments. The following embodiments are used for illustrating the present invention, but are not intended to limit the scope of the present invention.

First Embodiment

The design concept of the first embodiment of the present invention is in that a RGB color space is firstly converted to a HSV (Hue, Saturation, Value) color space, then brightness V is enhanced while keeping H, S unchanged in the HSV color space, and finally the HSV color space is converted to a RGBW color space.

Figure 1:
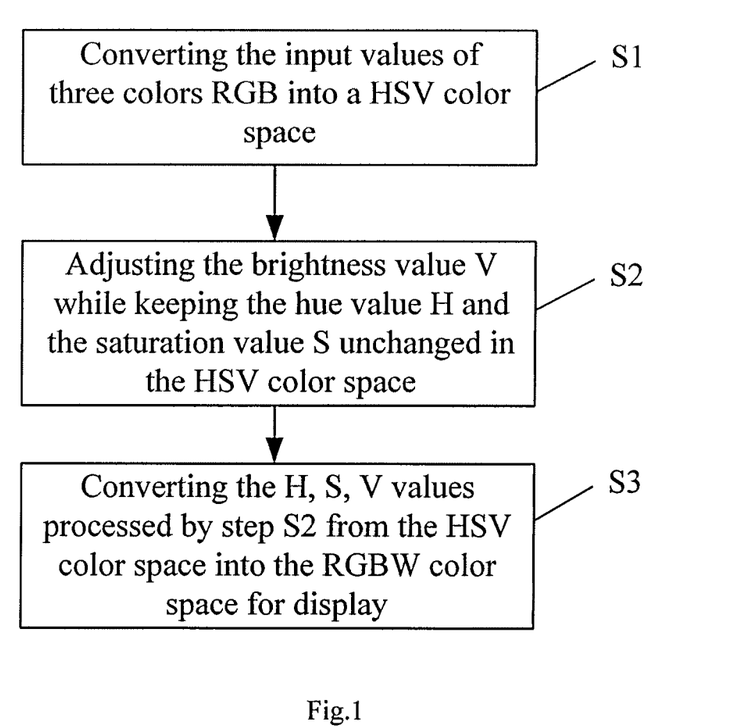
FIG. 1 is a flowchart of a method according to an embodiment of the present invention.
Figure 2:
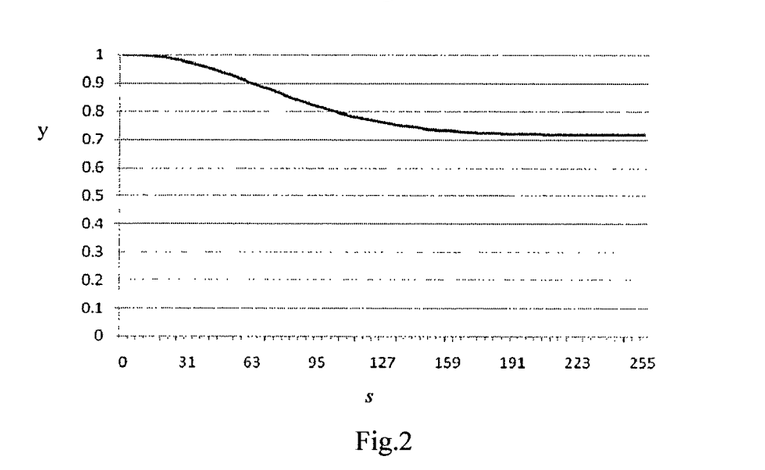
FIG. 2 is a Gaussian function used in brightness stretch.

In particular, as shown in FIG. 1, the method comprises the following steps:

Step 1: inputting RGB data of each of pixels by a LCD module via signal lines such as LVDS, and converting the input values of three colors Red, Green and Blue (RGB) into a HSV color space;

$$h = \begin{cases} 0° & \text{if max} = \text{min} \\ 60° \times \frac{g-b}{\max-\min} + 0°, & \text{if max} = r \text{ and } g \geq b \\ 60° \times \frac{g-b}{\max-\min} + 360°, & \text{if max} = r \text{ and } g < b \\ 60° \times \frac{b-r}{\max-\min} + 120°, & \text{if max} = g \\ 60° \times \frac{r-g}{\max-\min} + 240°, & \text{if max} = b \end{cases}$$

$$s = \begin{cases} 0, & \text{if max} = 0 \\ \frac{\max-\min}{\max} = 1 - \frac{\min}{\max}, & \text{otherwise} \end{cases}$$

$$v = \max$$

wherein, r represents the input value of color R, g represents the input value of color G, b represents the input value of color B, max represents the maximum in r, g and b, min represents the minimum in r, g, and b, h represents hue, s represents saturation, and v represents brightness;

Step 2: while keeping the hue value H and the saturation value S unchanged in the HSV color space, adjusting the brightness value V using the Gaussian function, V(RGBW)= V(RGB)*y; wherein the Gaussian function is shown as a curve in FIG. 2.

In an embodiment of the present invention, the expression of the Gaussian function is as follows:

$$y = A*e^{-a*(s/4)^2} + B,$$

wherein, y represents an adjusting coefficient of brightness, A represents an amplitude of the Gaussian function, e represents the natural logarithm, 'a' represents a parameter determining a Half-Width Height of the Gaussian function, s represents the saturation value, and B represents the adjustment value when s=255. In the present embodiment, a is preferably selected as 0.002, A is preferably selected as 0.28, and B is preferably selected as 0.72.

FIG. 2 shows a curve of the Gaussian function, wherein the abscissa represents the saturation value s, and the corresponding value y on the vertical coordinate represents the value calculated from the Gaussian function; the adjusted brightness value using the Gaussian function v'=v*y, wherein v represents the brightness value calculated from step Si. Taking the following example for illustration: if the saturation value s is equal to 0, it will be obtained that y is equal to 1 when the saturation value s is substituted into the Gaussian function (it can be seen from FIG. 2), then the adjusted brightness value v'=v*1; if the saturation value s is equal to 255, it will be obtained that y is equal to 0.74, then the adjusted brightness value v'=v*0.74. It can be seen from FIG. 2 that the brightness value can be adjusted by means of the above Gaussian function, and the result of the adjustment shows that the brightness value corresponding to a pixel with relative low saturation is increased and the brightness value corresponding to a pixel with relative high saturation is decreased. The parameters a, A, B in the above Gaussian function are selected according to the result of the experiment; and the experiment shows that the embodiments of the present invention utilizing the Gaussian function with such parameters can achieve the best effect and can enhance the brightness for display while maintaining better hue, better color saturation and natural color transition, and the effect which it can achieve is referred to FIG. 9d.

The converted HSV data is the HSV color space data corresponding to the RGBW color space.

Step 3: converting the H, S, V values processed by step 2 into the R, G, B, W values.

Figure 3:
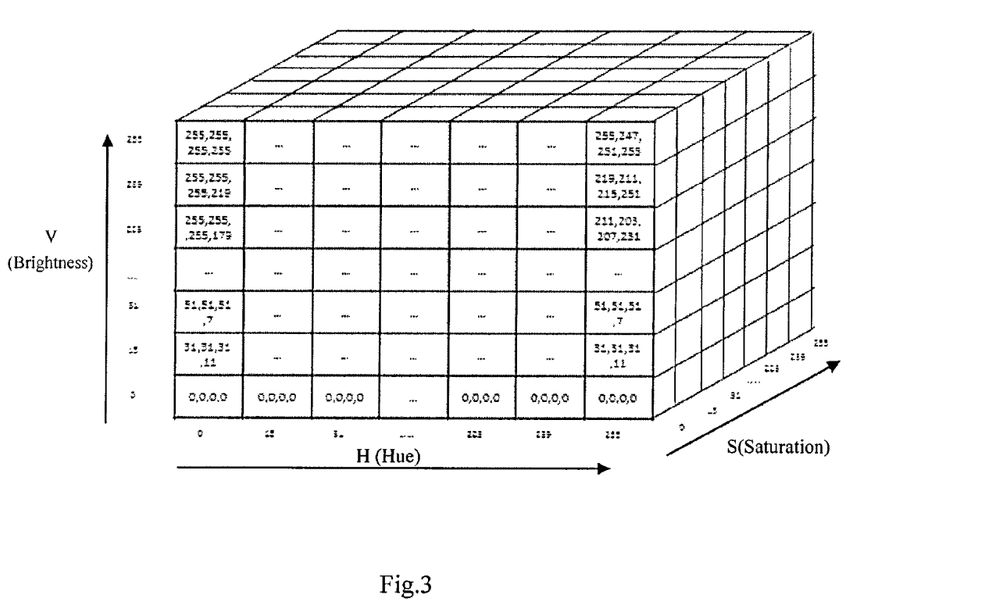
FIG. 3 is a schematic diagram of a three-dimension look-up table.

The three-dimension look-up table is a compressed three-dimension look-up table. A cubic cell corresponding to the three-dimension look-up table stores the RGBW data to be interpolated corresponding to a piece of HSV data. For instance, if a HSV value (0, 0, 255) is input, then the RGBW value as found out is (255, 255, 255, 255). The value found out needs to be used in the conversion process in the present step, and the specific convert process is explained hereinafter.

Figure 7A:
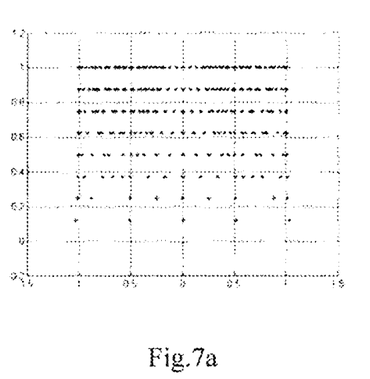
Figure 7B:
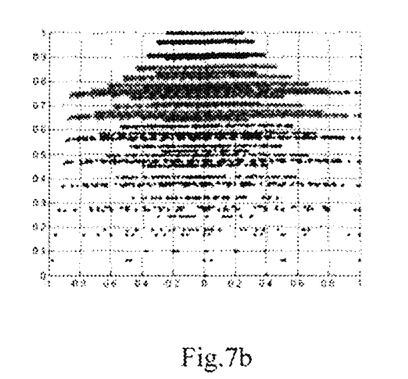
FIG. 7b is a section diagram when S=0 corresponding to FIG. 6b.

The actual three-dimension look-up table comprises all the input data, and thus in general, the size of the look-up table is 255*255*255*32 bits (530 Mb); however, such a large look-up table can not be implemented in hardware. Therefore, the look-up table needs to be compressed firstly, and only the data at a fix step position within 0-255 is stored, and the data which is not stored can be obtained by an interpolation. For example, the look-up table in FIG. 3 only stores the node data with the step equal to 16, then the size of the look-up table will be reduced to 16*16*16*16*32bits (132K), and such a look-up table can be easily implemented on a chip. Further, it can be seen in FIG. 7b, that data in the low brightness space in the HSV color space corresponding to RGBW are sparse, while there is a relative empty mapping area in the high brightness space, and thus the size of the look-up table can be further compressed to 64K, thus realizing a low cost chip.

Figure 4:
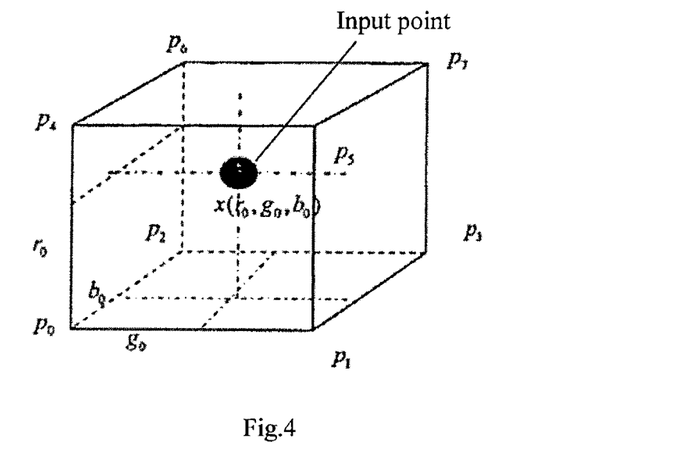
FIG. 4 is a schematic diagram showing an interpolation algorithm.

As an example, shown in FIG. 4, a cube in the look-up table where an input point X is located is divided into eight small cubes by three planes perpendicular to each other passing through the input point X in directions of x, y, and z axes respectively, and the volumes of the small cubes where respective vertexes of the cube pi are located are as follows:

$$V_0 = r_0 \cdot b_0 \cdot g_0$$

$$V_1 = r_0 \cdot b_0 \cdot (n-g_0)$$

$$V_2 = r_0 \cdot (m-b_0) \cdot g_0$$

$$V_3 = r_0 \cdot (m-b_0) \cdot (n-g_0)$$

$$V_4 = (l-r_0) \cdot b_0 \cdot g_0$$

$$V_5 = (l-r_0) \cdot b_0 \cdot (n-g_0)$$

$$V_6 = (l-r_0) \cdot (m-b_0) \cdot g_0$$

$$V_7 = (l-r_0) \cdot (m-b_0) \cdot (n-g_0)$$

wherein, $r_0$, $b_0$, $g_0$ represent the vertical distances from the input point X to the x, y and z axes respectively, m, n, l represent the length, width and height of the cube, then $$x' = \frac{1}{V}\sum_{i=0}^{7} q_i \cdot V_{7-i},$$

x' represents the obtained R, G, B, W values after conversion, $q_i$ represents the R, G, B, W values to be interpolated table corresponding to the eight vertexes of the cube in the look-up; the coordinates of the eight vertexes of the cube represent the corresponding H, S, V values in the look-up table, and are (H16, S16, V16), (H16+1, S16, V16), (H16, S16+1, V16), (H16+1, S16+1, V16), (H16, S16, V16+1), (H16+1, S16, V16+1), (H16, S16+1, V16+1), (H16+1, S16+1, V16+1) respectively. The coordinates of the input point X correspond to the obtained H, S, V values after being processed in step S2, i=0, 1, . . . , 7. If qi represents the R values corresponding to the eight vertexes, then the calculated x' is the R value to be solved, and the like.

Figure 5A:
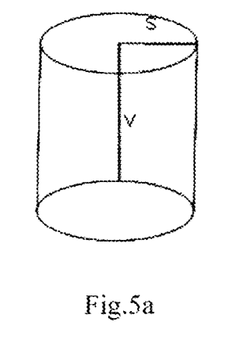
FIG. 5a is a HSV diagram corresponding to RGB.
Figure 5B:
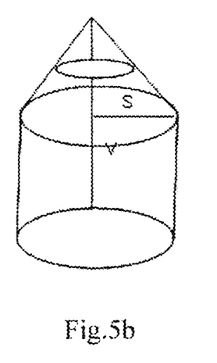
FIG. 5b is a HSV diagram corresponding to RGBW.
Figure 5C:
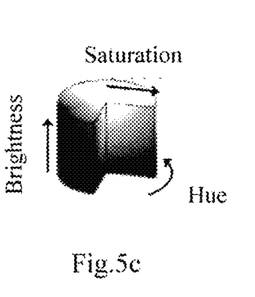
Figure 6A:
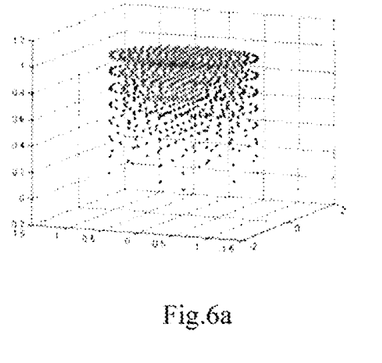
FIG. 6a is a HSV color space cubic diagram corresponding to RGB obtained by an actual simulation according to the method provided in the embodiment of the present invention.
Figure 6B:
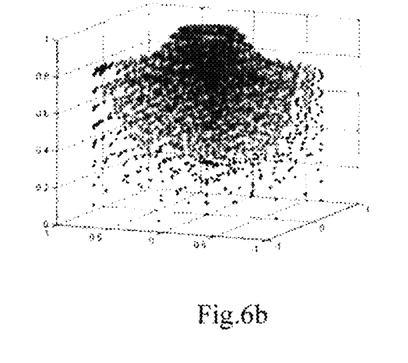
FIG. 6b is a HSV color space cubic diagram corresponding to RGBW.

FIGS. 5a, 5b and 5c are principle model diagrams obtained according to the method provided in the embodiments of the present invention; wherein FIG. 5a shows a principle model of the HSV color space corresponding to RGB obtained in the conversion process according to the embodiment of the present invention; FIG. 5b shows a principle model of the HSV color space corresponding to RGBW, and FIG. 5c shows a principle model of the HSV color space with variations in hue, saturation and brightness shown corresponding to FIG. 5a. It can be seen from FIGS. 5a, 5b and 5c that, compared to the RGB model, the RGBW model losses part of colors with high saturation and high brightness (for example, a pure color in highlight), but adds part of colors with low saturation and high brightness, and the maximum brightness of white color with low saturation can reach 1.5 times than that in the RGB space. Thus, the brightness of the display apparatus can be enhanced significantly; though the brightness of the color with high saturation may be decreased, the ratio of the color with high saturation occupied in the natural scene is very low, and thus the majority of colors can be displayed fully and truly without any affects.

Figure 8A:
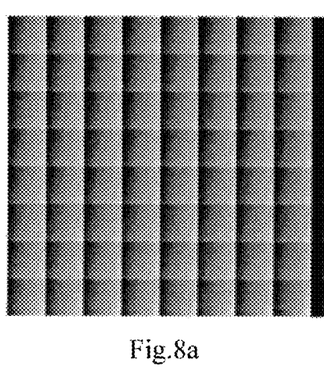
FIG. 8a shows RGB input data.
Figure 8B:
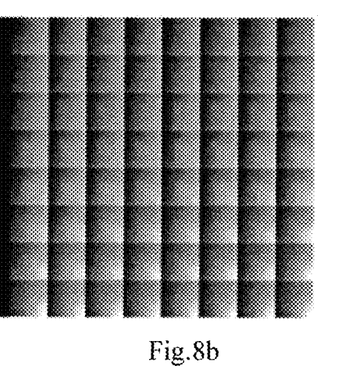
FIG. 8b shows RGBW output data.
Figure 9A:
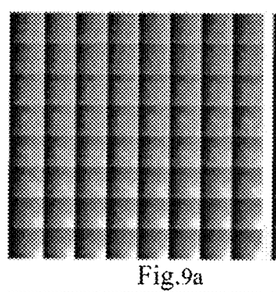
FIG. 9a is an effect diagram corresponding to the algorithm a in the prior art.
Figure 9B:
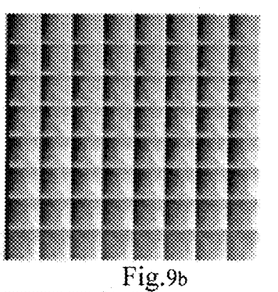
FIG. 9b is an effect diagram corresponding to an algorithm b in the prior art.
Figure 9C:
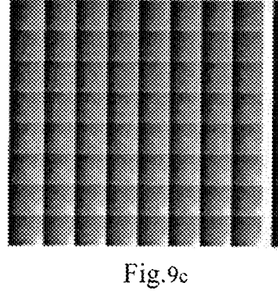
FIG. 9c is an effect diagram corresponding to an algorithm c in the prior art.
Figure 9D:
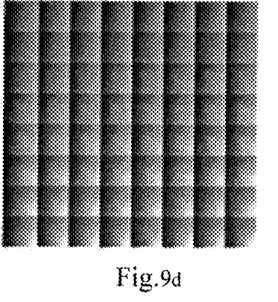
FIG. 9d is an effect diagram corresponding to the method provided in the embodiment of the present invention.

It can be seen from FIGS. 8 and 9 that the method of the embodiments of the present invention (the effect diagram thereof is shown in FIG. 9d) has advantages over the prior art in terms of enhancement of the brightness, maintainability of the hue and the color saturation. In particular, as shown in FIG. 9a, the existing algorithm a can maintain the saturation and brightness better, but has a problem in brightness transition of color; as shown in FIG. 9b, the existing algorithm b excessively focuses on the brightness, and there is a disorder in color; as shown in FIG. 9c, the existing algorithm c has an advantage of better data on saturation and brightness, but has a serious problem in color transition. In contrast, the method provided in the embodiment of the present invention has advantages of better hue, saturation, and brightness, as well as a suitable transition in color. Evaluation values for individual indexes are shown in table 1:

|  | h | s | v |
|---|---|---|---|
| RGB | 123 | 182 | 157 |
| Algorithm a | 123 | 183 | 148 |
| Algorithm b | 122 | 159 | 187 |
| Algorithm c | 123 | 190 | 146 |

-continued

|  | h | s | v |
|---|---|---|---|
| The embodiment of the invention | 123 | 182 | 147 |

Second Embodiment

Embodiments of the present invention further provide a system for processing RGB data, wherein the system comprises:

a first conversion module for converting the input values of three colors Red, Green and Blue (RGB) into a HSV color space;

a brightness adjusting module for adjusting the brightness value V while keeping the hue value H and the saturation value S unchanged in the HSV color space;

a second conversion module for converting the H, S, V values processed by the brightness adjusting module from the HSV color space into the RGBW color space.

The brightness adjusting module is particularly used for adjusting the brightness value V using the Gaussian function, $V(RGBW)=V(RGB)*y$; wherein $y=A*e^{-a*(s/4)^2}+B$, wherein, y represents an adjusting coefficient of brightness, A represents an amplitude of the Gaussian function, 'a' represents a parameter determining the Half-Width Height of the Gaussian function, s represents the saturation value, B represents the adjustment value when s=255.

The second conversion module is specifically used for looking up the R, G, B and W values to be interpolated corresponding to the H, S, and V values processed by the brightness adjusting module, and for obtaining the converted R, G, B, and W values by using the R, G, B and W values to be interpolated as found out.

The second conversion module is specifically used for dividing a cube in the look-up table where an input point X is located into eight small cubes by three planes perpendicular to each other passing through the input point X in the directions of x, y, and z axes respectively, and the coordinates of the input point X correspond to the obtained H, S, V values after being processed in step S2; the corresponding R, G, B, W values to be interpolated are found out via the look-up table according to the H, S, and V values. The volumes of the small cubes where the respective vertexes of the cube pi are located are as follows:

$V_0 = r_0 \cdot b_0 \cdot g_0$ $V_1 = r_0 \cdot b_0 \cdot (n-g_0)$ $V_2 = r_0 \cdot (m-b_0) \cdot g_0$ $V_3 = r_0 \cdot (m-b_0) \cdot (n-g_0)$ $V_4 = (l-r_0) \cdot b_0 \cdot g_0$ $V_5 = (l-r_0) \cdot b_0 \cdot (n-g_0)$ $V_6 = (l-r_0) \cdot (m-b_0) \cdot g_0$ $V_7 = (l-r_0) \cdot (m-b_0) \cdot (n-g_0)$ wherein, $r_0$, $b_0$, $g_0$ represent the vertical distances from the input point X to the x, y and z axes respectively, m, n, l represent the length, width and height of the cube, then $$x' = \frac{1}{V}\sum_{i=0}^{7} q_i \cdot V_{7-i},$$

x' represents the obtained R, G, B, W values after conversion, $q_i$ represents the R, G, B, W values to be interpolated corresponding to the eight vertexes of the cube in the look-up table, the coordinates of the eight vertexes of the cube represent the corresponding H, S, V values in the look-up table, i=0, 1, . . . , 7.

The first conversion module is specifically used for performing the conversion by means of the following equations:

$$h = \begin{cases} 0° & \text{if max} = \text{min} \\ 60° \times \frac{g-b}{\text{max}-\text{min}} + 0°, & \text{if max} = r \text{ and } g \geq b \\ 60° \times \frac{g-b}{\text{max}-\text{min}} + 360°, & \text{if max} = r \text{ and } g < b \\ 60° \times \frac{b-r}{\text{max}-\text{min}} + 120°, & \text{if max} = g \\ 60° \times \frac{r-g}{\text{max}-\text{min}} + 240°, & \text{if max} = b \end{cases}$$

$$s = \begin{cases} 0, & \text{if max} = 0 \\ \frac{\text{max}-\text{min}}{\text{max}} = 1 - \frac{\text{min}}{\text{max}}, & \text{otherwise} \end{cases}$$

$$v = \text{max}$$

wherein, r represents the input value of color R, g represents the input value of color G, b represents the input value of color B, max represents the maximum in r, g and b, min represents the minimum in r, g, and b, h represents hue, s represents saturation, and v represents brightness.

It can be seen from that in the embodiments of the present invention, the RGB color space is firstly converted to the HSV color space, then the brightness V is enhanced while keeping H, S unchanged in the HSV color space, and finally the HSV color space is converted to RGBW color space; thus enhancing the brightness for display while maintaining better hue, color saturation and natural color transition at the same time.

The above only illustrates the embodiments of the present invention. It should be noted that it is easy for those skilled in the art to make several modifications and substitutes to the embodiments of the present invention without departing from the scope of the present inventive principle, and these modifications and embodiments are intended to fall into the protection scope of the present invention.

What claimed is:

1. A method for processing Red(R), Green(G) and Blue (B)data in a display apparatus, comprising steps of:
   a processor executing instructions stored in a storage device including:
   S1: inputting RGB data of each of pixels by a LCD (liquid crystal display) module via signal lines, and converting input values of three colors RGB into a HSV color space;
   S2: adjusting a brightness value V while keeping a hue value H and a saturation value S unchanged in the H (hue), S (saturation), V (brightness) color space;
   S3: converting the H, S, V values processed by step S2 to R, G, B, W values by a look up table of 64K (kilobits) to display, in order to improve display brightness while maintaining the hue and saturation values,
   wherein, in the step S2, the brightness value V is adjusted using a Gaussian function, V(RGBW)=V(RGB)*y; wherein $y=A*e^{-a*(s/4)^2}+B$, wherein, y represents an adjusting coefficient of brightness, A represents an amplitude of the Gaussian function, 'a' represents a parameter determining a Half-Width Height of the Gaussian function, s represents a saturation value, B represents an adjustment value when s=255, and
   wherein the step S3 is specifically as follows: dividing a cube in the look-up table where an input point X is located into eight small cubes by three planes perpendicular to each other passing through the input point X in directions of x, v, and z axes respectively, and the coordinates of the input point X correspond to the H, S, V values obtained after being processed in step S2; the corresponding R, G, B, W values to be interpolated are found out via the look-up table according to the H, S, and V values; the volumes of the small cubes where the respective vertexes pi of the cube are located are as follows:

$$V_0 = r_0 \cdot b_0 \cdot g_0$$

$$V_1 = r_0 \cdot b_0 \cdot (n-g_0)$$

$$V_2 = r_0 \cdot (m-b_0) \cdot g_0$$

$$V_3 = r_0 \cdot (m-b_0) \cdot (n-g_0)$$

$$V_4 = (l-r_0) \cdot b_0 \cdot g_0$$

$$V_5 = (l-r_0) \cdot b_0 \cdot (n-g_0)$$

$$V_6 = (l-r_0) \cdot (m-b_0) \cdot g_0$$

$$V_7 = (l-r_0) \cdot (m-b_0) \cdot (n-g_0)$$

wherein, $r_0$, $b_0$, $g_0$ represent the vertical distances from the input point X to the x, y and z axes respectively, m, n, l represent a length, width and height of the cube, then $$x' = \frac{1}{V} \sum_{i=0}^{7} q_i \cdot V_{7-i},$$

x' represents the R, G, B, W values obtained after conversion, $q_i$ represents the R, G, B, W values to be interpolated corresponding to the eight vertexes of the cube in the look-up table, and the coordinates of the eight vertexes of the cube represent the corresponding H, S, V values in the look-up table, i=0, 1, . . . , 7.

2. The method of claim 1, wherein in the step S3, the R, G, B and W values to be interpolated corresponding to the H, S, and V values processed in the step S2 are looked up via a three-dimension look-up table, and the converted R, G, B, and W values are obtained by using the R, G, B and W values to be interpolated as found out.

3. The method of claim 1, wherein the step S1 is specifically as follows: performing the conversion by means of the following equations:

$$h = \begin{cases} 0° & \text{if max} = \text{min} \\ 60° \times \frac{g-b}{\text{max}-\text{min}} + 0°, & \text{if max} = r \text{ and } g \geq b \\ 60° \times \frac{g-b}{\text{max}-\text{min}} + 360°, & \text{if max} = r \text{ and } g < b \\ 60° \times \frac{b-r}{\text{max}-\text{min}} + 120°, & \text{if max} = g \\ 60° \times \frac{r-g}{\text{max}-\text{min}} + 240°, & \text{if max} = b \end{cases}$$

-continued $$s = \begin{cases} 0, & \text{if max} = 0 \\ \dfrac{\max - \min}{\max} = 1 - \dfrac{\min}{\max}, & \text{otherwise} \end{cases}$$

$$v = \max$$

wherein, r represents the input value of color R, g represents the input value of color G, b represents the input value of color B, max represents the maximum in r, g and b, min represents the minimum in r, g, and b, h represents hue, s represents saturation, and v represents brightness.

4. A system for processing RGB data in a display apparatus, comprising:
   a processor executing instructions stored in a storage device including:
   a first conversion module for receiving RGB data of each of pixels from a LCD (liquid crystal display) module via signal lines, and converting input values of the three colors Red(R), Green(G) and Blue (B) into a HSV color space;
   a brightness adjusting module for adjusting a brightness value V while keeping a hue value H and a saturation value S unchanged in the H (hue), S (saturation), V (brightness) color space; and
   a second conversion module for converting the H, S, V values processed by the brightness adjusting module into the RGBW (white) color space from the HSV color space by a look up table of 64K (kilobits), in order to improve display brightness while maintaining the hue and saturation values,
   wherein the brightness adjusting module is particularly used for adjusting the brightness value V using a Gaussian function, V(RGBW)=V(RGB)*y; wherein $y = A*e^{-a*(s/4)^2} + B$,
   wherein, y represents an adjusting coefficient of brightness, A represents an amplitude of the Gaussian function, 'a' represents a parameter determining a Half-Width Height of the Gaussian function, s represents the saturation value, B represents the adjustment value when s=255 and
   wherein the second conversion module is specifically used for dividing a cube in the look-up table where an input point X is located into eight small cubes by three planes perpendicular to each other passing through the input point X in directions of x, y, and z axes respectively, and coordinates of the input point X correspond to the H, S, V values obtained after being processed in step S2; wherein the corresponding R, G, B, W values to be interpolated are found out via the look-up table according to the H, S, and V values, and volumes of the small cubes where the respective vertexes of the cube pi are located are as follows:

$$V_0 = r_0 \cdot b_0 \cdot g_0$$

$$V_1 = r_0 \cdot b_0 \cdot (n - g_0)$$

$$V_2 = r_0 \cdot (m - b_0) \cdot g_0$$

$$V_3 = r_0 \cdot (m - b_0) \cdot (n - g_0)$$

$$V_4 = (l - r_0) \cdot b_0 \cdot g_0$$

$$V_5 = (l - r_0) \cdot b_0 \cdot (n - g_0)$$

$$V_6 = (l - r_0) \cdot (m - b_0) \cdot g_0$$

$$V_7 = (l - r_0) \cdot (m - b_0) \cdot (n - g_0)$$

wherein, $r_0$, $b_0$, $g_0$ represent vertical distances from the input point X to the x, y and z axes respectively, m, n, l represent a length, width and height of the cube, then $$x' = \frac{1}{V} \sum_{i=0}^{7} q_i \cdot V_{7-i},$$

x' represents the R, G, B, W values obtained after conversion, $q_i$ represents the R, G, B, W values to be interpolated corresponding to the eight vertexes of the cube in the look-up table, and coordinates of the eight vertexes of the cube represent the corresponding H, S, V values in the look-up table, i=0, 1, . . . , 7.

5. The system of claim 4, wherein the second conversion module is specifically used for looking up the R, G, B and W values to be interpolated corresponding to the H, S, and V values processed by the brightness adjusting module, via a three-dimension look-up table, and for obtaining the converted R, G, B, and W values by using the R, G, B and W values to be interpolated as found out.

6. The system of claim 4, wherein the first conversion module is specifically used for performing the conversion by means of the following equations:

$$h = \begin{cases} 0°, & \text{if max} = \min \\ 60° \times \dfrac{g-b}{\max - \min} + 0°, & \text{if max} = r \text{ and } g \geq b \\ 60° \times \dfrac{g-b}{\max - \min} + 360°, & \text{if max} = r \text{ and } g < b \\ 60° \times \dfrac{b-r}{\max - \min} + 120°, & \text{if max} = g \\ 60° \times \dfrac{r-g}{\max - \min} + 240°, & \text{if max} = b \end{cases}$$

$$s = \begin{cases} 0, & \text{if max} = 0 \\ \dfrac{\max - \min}{\max} = 1 - \dfrac{\min}{\max}, & \text{otherwise} \end{cases}$$

$$v = \max$$

wherein, r represents the input value of color R, g represents the input value of color G, b represents the input value of color B, max represents the maximum in r, g and b, min represents the minimum in r, g, and b, h represents hue, s represents saturation, and v represents brightness.

* * * * *